(12) United States Patent
Patterson

(10) Patent No.: US 12,703,316 B2
(45) Date of Patent: Aug. 11, 2026

(54) SYSTEM AND METHOD TO REDUCE VISCOUS LOSSES OF ELECTRIC VEHICLE

(71) Applicant: Ford Global Technologies, LLC, Dearborn, MI (US)

(72) Inventor: William Rey Patterson, Houston, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 655 days.

(21) Appl. No.: 18/297,380

(22) Filed: Apr. 7, 2023

(65) Prior Publication Data

US 2024/0336214 A1 Oct. 10, 2024

(51) Int. Cl.

| | |
|---|---|
| ***B60R 17/02*** | (2006.01) |
| ***F16H 57/04*** | (2010.01) |
| ***H02K 9/19*** | (2006.01) |

(52) U.S. Cl.

CPC ......... *B60R 17/02* (2013.01); *F16H 57/0413* (2013.01); *F16H 57/0423* (2013.01); *F16H 57/0435* (2013.01); *F16H 57/0441* (2013.01); *F16H 57/0476* (2013.01); *H02K 9/19* (2013.01)

(58) Field of Classification Search

CPC .............. B60R 17/02; B60K 2001/003; F16H 57/0413; F16H 57/0423; F16H 57/0435; F16H 57/0436; F16H 57/0441; F16H 57/0476; H02K 9/19

See application file for complete search history.

(56) References Cited

U.S. PATENT DOCUMENTS

| | | | | |
|---|---|---|---|---|
| 5,718,302 A * | 2/1998 | Hasebe | H02K 7/116 180/65.6 |
| 9,964,019 B2 | 5/2018 | Gopal | |
| 11,035,265 B2 | 6/2021 | Ni | |
| 2008/0109129 A1* | 5/2008 | Yanagida | B60K 6/26 184/104.1 |
| 2010/0057315 A1* | 3/2010 | Yamamoto | F16H 57/0434 701/58 |
| 2011/0084561 A1* | 4/2011 | Swales | H02K 11/05 180/65.26 |
| 2011/0232786 A1* | 9/2011 | Matsushita | F16H 57/0476 137/565.11 |
| 2014/0010668 A1* | 1/2014 | Sah | F16H 61/0021 903/915 |
| 2015/0222162 A1* | 8/2015 | Pinkley | H02K 9/19 310/54 |
| 2017/0144532 A1* | 5/2017 | Tokozakura | B60K 6/445 |
| 2019/0291570 A1* | 9/2019 | Tang | B60K 11/04 |
| 2021/0062708 A1 | 3/2021 | Grosch et al. | |
| 2022/0285756 A1 | 9/2022 | Eser et al. | |

(Continued)

FOREIGN PATENT DOCUMENTS

WO 2022005373 A1 1/2022

*Primary Examiner* — Eric S Ruppert
*Assistant Examiner* — Hans R Weiland
(74) *Attorney, Agent, or Firm* — McCoy Russell LLP

(57) ABSTRACT

Systems and methods for cooling and delivering oil for an electric vehicle are described. In one example, viscosity of oil and resistance to oil flow of an oil circuit reduce oil flow through a cooling circuit so as to reduce powertrain losses that may be related to oil viscosity. At higher temperatures, the viscosity of oil allows the oil to flow through the cooling circuit and lower a temperature of an electric machine.

20 Claims, 3 Drawing Sheets

(56) References Cited

U.S. PATENT DOCUMENTS

2022/0355645 A1 11/2022 Jeong
2023/0256810 A1* 8/2023 Oechslen .............. B60K 11/02
62/79

* cited by examiner 110
111
121
100
102
122
122a
122b
126
126a
128
130
131
132
134
135
136
138
139
140
145
146
147
148
156
157
175
176
177
178
192
194
195
199
TO 112
TO 212
112
165
166
167
168
Control System 114
116 Sensors
181 Actuators

SYSTEM AND METHOD TO REDUCE VISCOUS LOSSES OF ELECTRIC VEHICLE

FIELD

The present description relates to a method and system for operating an electric vehicle.

BACKGROUND

An electric machine may be coupled to a gearbox to drive vehicle wheels. The electric machine may apply oil as a coolant and the oil may also be applied to lubricate a gearbox that is mechanically coupled to the electric machine. A pump may supply the oil to a heat exchanger or an oil cooler prior to sending the oil to the electric machine and the gearbox. The oil cooler extracts heat from the oil and supplies the cooled oil to the electric machine so that the electric machine may avoid overheating. The cooled oil may also be supplied to the gearbox where it may lubricate gears and cool components that are included in the gearbox. However, when ambient temperature is low, the viscosity of the oil may increase, thereby increasing losses within the gearbox. The gearbox losses at lower temperatures may cause the electric machine to consume additional electric power to generate a requested torque at lower ambient temperatures as compared to when the electric machine and gearbox are operated at higher temperatures.

The inventors herein have recognized the above-mentioned issues and have developed a system, comprising: an electric machine; a gearbox mechanically coupled to the electric machine and wheels of a vehicle, the gearbox including lubricating passages or conduits; an oil sump configured to receive returned oil from the electric machine and the gearbox; an oil pump configured to draw oil from the oil sump; an oil cooler; and an oil passage or conduit extending from the oil pump to a second oil passage or conduit that extends to the oil cooler, the oil passage or conduit also extending to a third oil passage or conduit that extends to the lubricating passages or conduits, the oil passage or conduit extending from the oil pump, the second oil passage or conduit, and the third oil passage or conduit, not including control valves to control a flow of oil to the lubricating passages and the electric machine.

By leveraging a property of oil (e.g., viscosity) and providing two oil circuits having different resistances to oil flow, it may be possible to reduce losses of an electric drive system that are related to oil viscosity at lower ambient temperatures. Specifically, at lower ambient temperatures, the viscosity of oil is increased so that it may be more difficult to flow the oil through a cooling circuit due to the cooling circuit's resistance to flow. However, oil may continue to flow through lubricating circuits of a gearbox where moving gears may generate heat from friction. The heated oil may lower losses in the system at lower temperatures and allow the oil temperature to increase at a faster rate. As oil temperature reaches operating temperature, the viscosity of the oil is decreased so that the oil may flow through both the oil cooler and the lubricating circuits. This allows the temperature of the oil to be controlled so that the oil may remove heat from an electric machine that provides torque to vehicle wheels.

The present description may provide several advantages. In particular, the approach may lower system losses that may be related to oil viscosity. Further, the approach may reduce cost of an oil cooling system. Further still, the approach may be implemented with or without a controller.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
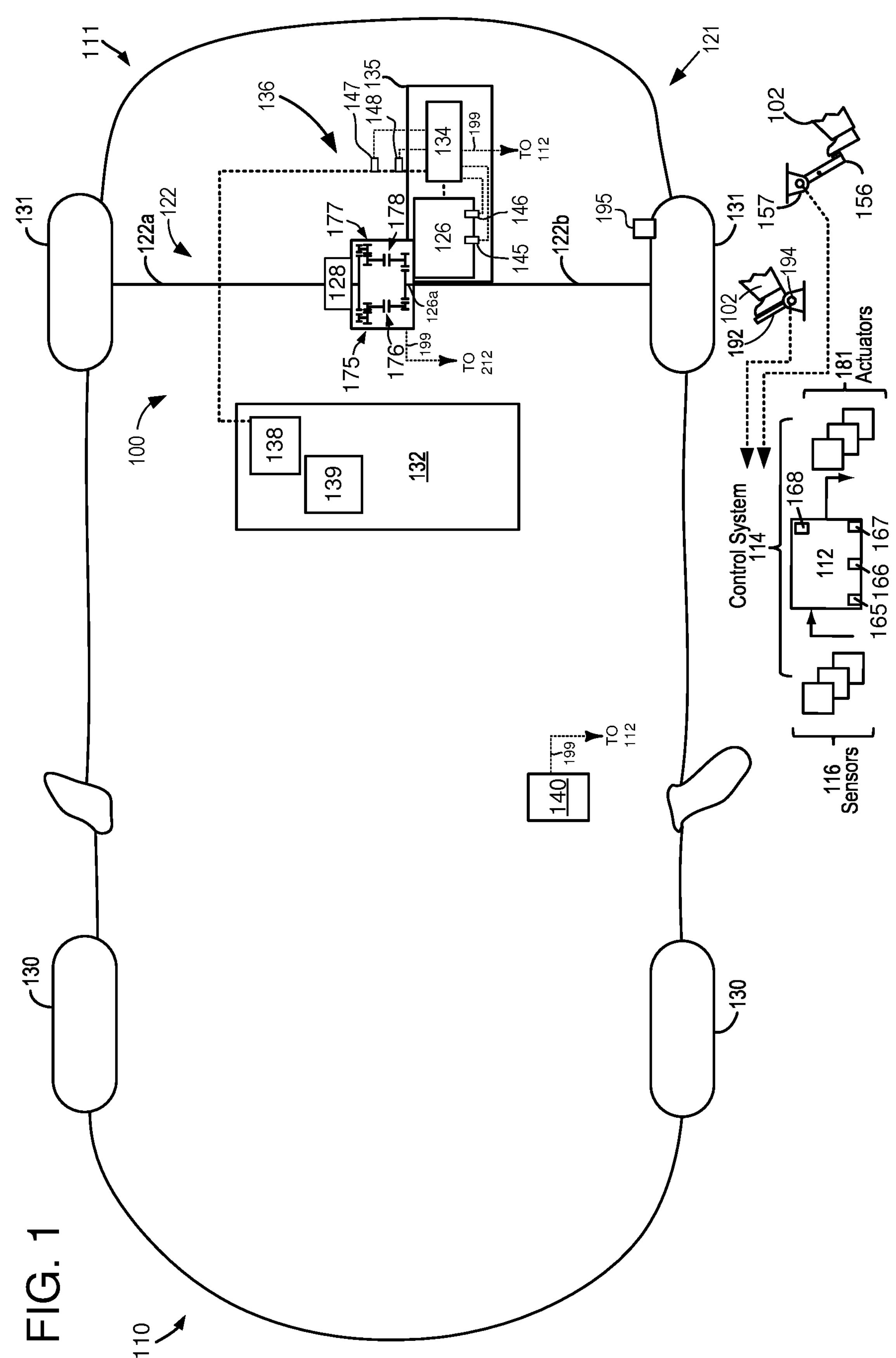
FIG. 1 is a schematic diagram of a vehicle that includes an electric machine for propulsion.
Figure 2:
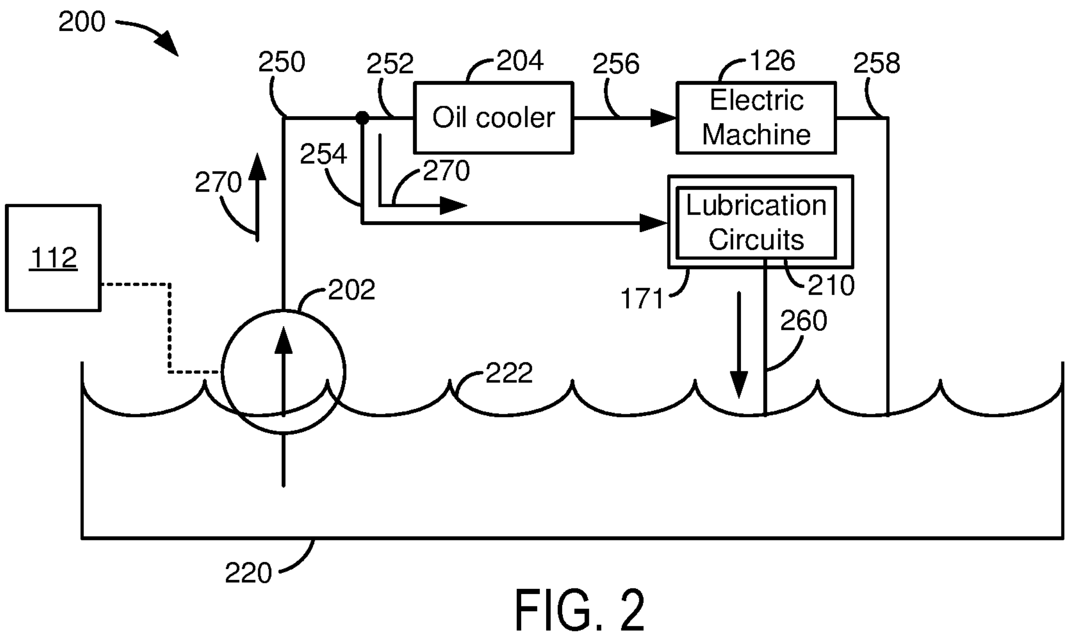
FIGS. 2 and 3 show a block diagram of an oil circuits including a lubrication circuit and a cooling circuit.
Figure 3:
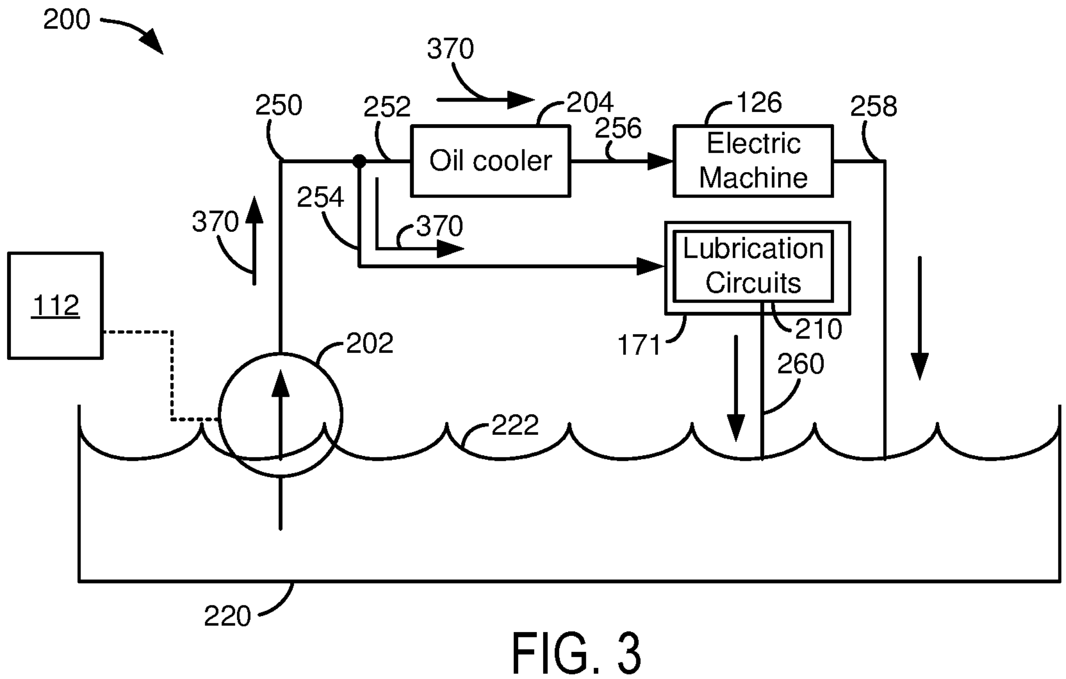
Figure 4:
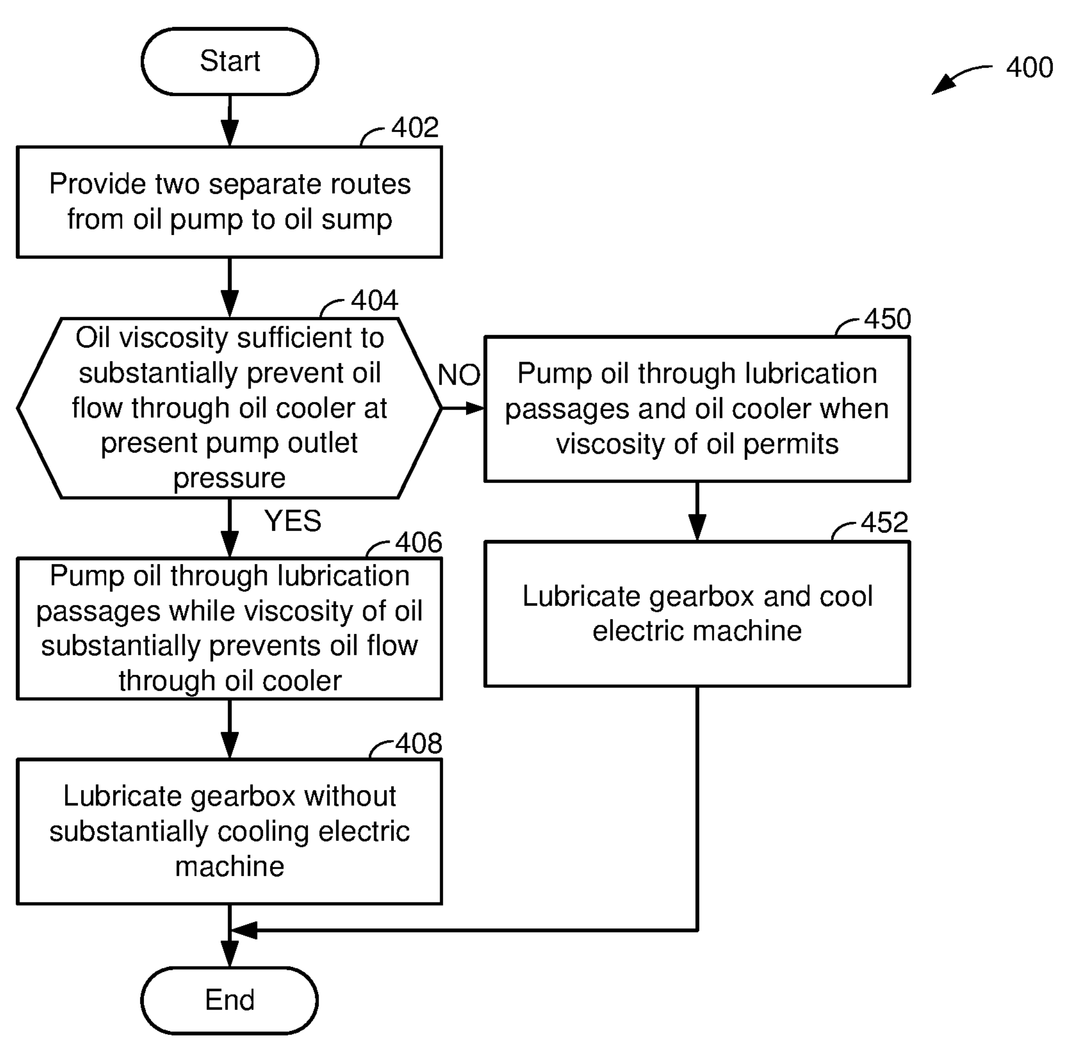
FIG. 4 shows a block diagram of a method for lubricating and cooling components of an electric vehicle.

The present description is related to reducing losses of an electric vehicle driveline that may be related to viscosity of oil. The electric vehicle driveline may be included in a vehicle of the type that is shown in FIG. 1. The electric vehicle driveline may operate as shown in FIGS. 2 and 3 according to the method of FIG. 4. A block diagram of a method for controlling lubrication and cooling of an electric vehicle driveline is shown in FIG. 4. The method of FIG. 4 may be performed with or without a controller.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft **122*a*, and second half shaft 122*b*. Vehicle propulsion system 100 further has front wheels 130 and rear wheels 131. Rear wheels 131 may be driven via electric machine 126**.

The rear axle 122 is coupled to electric machine 126. Rear drive unit 136 may transfer power from electric machine 126 to axle 122 resulting in rotation of rear wheels 131. Rear drive unit 136 may include a gearbox 171 including a low gear 175 and a high gear 177 that are coupled to electric machine 126 via output shaft **126*a* of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122*a* and to second half shaft 122*b*. In some examples, an electrically controlled differential clutch (not shown) may be included in rear drive unit 136**.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from brake pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134.

Referring now to FIG. 2, a block diagram of a cooling and lubrication system 200 is shown. Cooling and lubrication system 200 includes an oil pump 202, oil cooler 204, electric machine 126, and gearbox 171 including lubrication passages or conduits 210. A first passage or conduit 250 extends from oil pump 202 to a position where the passage or conduit is split into a second passage or conduit 252 and a third passage or conduit 254. The second passage or conduit extends from the first passage or conduit to oil cooler 204. The third passage or conduit extends from the first passage or conduit to gearbox 171 and lubrication passages or conduits 210. A fourth passage or conduit 256 extends from oil cooler 204 to electric machine 126. A fifth passage or conduit 258 extents from electric machine 126 to oil sump 220. A sixth passage or conduit 260 extends from gearbox 171 to oil sump 220.

Oil pump 202 may be mechanically driven or electrically driven. In one example, oil pump may be activated and controlled via controller 112. Further, controller 112 may adjust a speed of oil pump 202 in response to ambient air temperature, oil temperature, and/or a temperature of electric machine 126.

FIG. 2 shows the direction of oil flow when oil temperature is less than a threshold temperature. In particular, at cold oil temperatures, the viscosity of oil 222 increases. The increased oil viscosity combined with the flow resistance of first oil circuit (e.g., oil cooler 204, passage or conduit 256, and electric machine 126) substantially prevents oil flow through oil cooler 204 (e.g., oil flow through oil cooler is less than 10% of oil flowing through oil pump 202) when oil temperature is less than a threshold temperature. However, when oil temperature is less than the threshold temperature, oil may still flow through second oil circuit (e.g., gearbox 171 and lubrication passages or conduits 210) so that gears and shafts may be lubricated via the lubrication passages or conduits 210. The resistance to oil flow by the second oil circuit is less than the resistance to oil flow by the first oil circuit. By flowing substantially most of the pumped oil through the gearbox at cold oil temperatures, the oil temperature may be increased sooner because little oil is cooled via oil cooler 204 (e.g., a heat exchanger that extracts heat energy from oil, thereby reducing oil temperature). Consequently, a greater percentage of output power from electric machine 126 may be applied to propel the vehicle. The oil flows in the direction of arrows 270 when oil temperature is less than the threshold temperature.

In this way, oil flow through oil cooler 204 and electric machine 126 may be reduced at lower oil temperatures to reduce powertrain losses that may be related to oil viscosity. This may be achieved without including any control valves in passages or conduits that feed oil to oil cooler 204 and gearbox 171. Consequently, system cost and complexity may be reduced.

Referring now to FIG. 3, a block diagram of a cooling and lubrication system 200 is shown. The block diagram of FIG. 3 is the same as the block diagram as shown in FIG. 2, but the block diagram of FIG. 3 shows oil flow when oil temperature is greater than the threshold temperature. All of the components shown in FIG. 3 that are numbered equivalent to components in FIG. 2 are the same components shown in FIG. 2. Therefore, for the sake of brevity, the description of these components is not repeated.

Oil flows through cooling and lubrication system 200 in the direction that is indicated by arrows 370. In particular, oil pump delivers oil to oil cooler 204 and gearbox 171. The oil that is delivered by the oil pump flows through both of the oil cooler 204 and gearbox 171. The oil is cooled via oil cooler 204 and the cooled oil may then be heated by electric machine 126, thereby cooling electric machine 126. The oil also lubricates gearbox 171. Oil that passes through oil cooler 204 and electric machine 126 does not pass through gearbox 171 in a single pass of the oil through the cooling and lubrication system 200.

A single pass through the cooling and lubrication system 200 begins at oil sump 220. The single pass of oil through the cooling and lubrication system 200 then includes flowing through oil pump 202. The oil may then pass through either, but not both, of oil cooler 204 or gearbox 171. Oil returns from electric machine 126 or gearbox 171 before returning to oil sump 220 to complete one single pass of the oil through the cooling and lubricating system 200.

The system of FIGS. 1-3 provides for a system, comprising: an electric machine; a gearbox mechanically coupled to the electric machine and wheels of a vehicle, the gearbox including lubricating passages or conduits; an oil sump configured to receive returned oil from the electric machine and the gearbox; an oil pump configured to draw oil from the oil sump; an oil cooler; and an oil passage or conduit extending from the oil pump to a second oil passage or conduit that extends to the oil cooler, the oil passage or conduit also extending to a third oil passage or conduit that extends to the lubricating passages or conduits, the oil passage or conduit extending from the oil pump, the second oil passage or conduit, and the third oil passage or conduit, not including control valves to control a flow of oil to the lubricating passages and the electric machine. In a first example, the system includes a fourth oil passage or conduit extending from the oil cooler to the electric machine, the fourth oil passage or conduit not extending to the lubricating passages or conduits. In a second example that may include the first example, the system further comprises a fifth oil passage or conduit extending from the electric machine to the oil sump. In a third example that may include one or both of the first and second examples, the system further comprises a sixth oil passage or conduit extending from the lubricating passages to the oil sump. In a fourth example that may include one or more of the first through third examples, the system includes where the oil pump is mechanically driven. In a fifth example that may include one or more of the first through fourth examples, the system includes where the oil pump is electrically driven. In a sixth example that may include one or more of the first through fifth examples, the system further comprises a controller including executable instructions stored in non-transitory memory that cause the controller to activate the oil pump. In a seventh example that may include one or more of the first through sixth examples, the system further comprises additional instructions that cause the controller to adjust a speed of the oil pump in response to an oil temperature.

The system of FIGS. 1-3 also provides for a system, comprising: an electric machine; a gearbox mechanically coupled to the electric machine and wheels of a vehicle, the gearbox including lubricating passages or conduits; an oil sump configured to receive returned oil from the electric machine and the gearbox; an oil pump configured to draw oil from the oil sump; an oil cooler; an oil passage or conduit extending from the oil pump to a second oil passage or conduit that extends to the oil cooler, the oil passage or conduit also extending to a third oil passage or conduit that extends to the lubricating passages or conduits, the oil passage or conduit extending from the oil pump, the second oil passage or conduit, and the third oil passage or conduit, not including control valves to control a flow of oil to the lubricating passages and the electric machine; a first oil circuit including the oil cooler and the electric machine; and a second oil circuit including the lubricating passages, the first oil circuit having a higher resistance to flow of oil than the second oil circuit. In a first example, the system includes where the higher resistance to flow substantially prevents oil flow through the oil cooler at temperatures that are below a threshold temperature. In a second example that may include the first example, the system includes where the oil pump is mechanically driven. In a third example that may include one or both of the first and second examples, the system includes where the oil pump is electrically driven. In a fourth example that may include one or more of the first through third examples, the system further comprises a controller, the controller including executable instructions stored in non-transitory memory that cause the controller to adjust a speed of the pump in response to an oil temperature and an electric machine temperature.

Referring to FIG. 4, a flowchart of a method for supplying oil to an electric machine and gearbox is shown. The method of FIG. 4 may be at least partially implemented as executable instructions stored in controller memory in the systems of FIGS. 1-3. Further, the method of FIG. 4 may include actions taken in the physical world to transform operating states of the system of FIGS. 1-3. In addition, in some examples, the method of FIG. 4 may be distributed amongst several controllers where each controller performs a portion of the method.

At 402, method 400 supplies two separate routes from an oil pump to an oil sump. For example, as shown in FIGS. 2 and 3, one route may include passages or conduits 250, 252, 256, and 258. A second route may include passages or conduits 250, 254, and 260.

Additionally, method 400 may activate the oil pump in response to a request to activate the vehicle if the oil pump is electrically driven. Method 400 may also adjust a speed of the oil pump according to the following equation: Oil_p_speed=f(oil_t, elect_t, amb_t), where Oil_p_speed is the commanded oil pump speed, f is a function that returns the oil pump speed, oil_t is oil temperature, elect_t is electric machine temperature, and amb_t is ambient temperature. Thus, the oil pump speed may be a function of oil temperature, electric machine temperature, and ambient air temperature. Method 400 proceeds to 404.

At 404, method 400 judges whether or not the viscosity of oil in the cooling and lubrication system 200 is sufficient to substantially prevent oil flow through the oil cooler 204 at the present outlet pressure of the oil pump 202. Substantially prevent oil flow through the oil cooler 204 includes flowing less than 10% of the oil flowing through oil pump 202. If so, the answer is yes and method 400 proceeds to 406. If not, the answer is no and method 400 proceeds to 450.

At 406, method 400 pumps oil through lubrication passages of a gearbox while the oil's viscosity and the oil cooler's resistance to oil flow substantially prevents oil from flowing through the oil cooler and the electric machine. For example, less than 10% of oil flowing through the oil pump flows through the oil cooler and the electric machine. This allows the oil to be heated via friction in the gearbox while limiting cooling of oil by restricted oil flow that is due to the oil's viscosity and the oil cooler's resistance to oil flow. Accordingly, the oil may be heated to reduce viscosity related losses in the vehicle driveline. Method 400 proceeds to 408.

At 408, method 400 lubricates components of the gearbox (e.g., gears, shafts, etc.) without substantially cooling the electric machine. Since little if any oil flows through the oil cooler and electric machine, the electric machine is not cooled substantially (e.g., temperature of the electric machine may be reduced by less than a threshold amount, such as one degree Celsius). Method 400 proceeds to exit.

At 450, method 400 pumps oil through lubrication passages of a gearbox, the oil cooler, and electric machine while the oil's viscosity and the oil cooler's resistance allows oil to flow through the oil cooler and the electric machine. This allows the oil to be cooled so that the cooled oil may lower a temperature of the electric machine. Accordingly, the same oil circuits that reduce viscosity related losses in the vehicle driveline may provide cooling to the electric machine. Method 400 proceeds to 452.

At 452, method 400 lubricates components of the gearbox (e.g., gears, shafts, etc.) while cooling the electric machine. Since the viscosity of the oil decreases at higher oil temperatures, oil may flow through the oil cooler and into the electric machine so that the electric machine may be cooled via cooled oil. Method 400 proceeds to exit.

In this way, method 400 may prevent cooling of oil when the oil temperature is less than a threshold temperature so that viscosity related driveline losses may be reduced. Further, the direction of oil flow may be controlled by the oil's viscosity and oil circuit resistance to oil flow so that valves need not be included or used in the cooling and lubricating system.

Thus, the method of FIG. 4 provides for a method for an electric powertrain, comprising: pumping oil from a sump through a passage or conduit that extends from an oil pump to a second passage or conduit and a third passage or conduit, the second passage or conduit extending to an oil cooler, the third passage or conduit extending to lubrication circuits of a gearbox, the gearbox mechanically coupled to an electric machine, and an absence of control valves positioned along the passage or conduit, the second passage or conduit, and the third passage or conduit. In a first example, the method further comprises returning oil from the gearbox to the sump. In a second example that may include the first example, the method further comprises flowing oil from the oil cooler to an electric machine. In a third example that may include one or both of the first and second examples, the method includes where the electric machine is configured to drive one or more wheels. In a fourth example that may include one or more of the first through third examples, the method further comprises returning oil from the electric machine to the sump. In a fifth example that may include one or more of the first through fourth examples, the method further comprises activating the oil pump via a controller. In a sixth example that may include one or more of the first through fifth examples, the method further comprises adjusting a speed of the oil pump via the controller in response to oil temperature and electric machine temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A system, comprising:

an electric machine;

a gearbox mechanically coupled to the electric machine and wheels of a vehicle, the gearbox including lubricating passages or conduits;

an oil sump configured to receive returned oil from the electric machine and the gearbox;

an oil pump configured to draw oil from the oil sump;

an oil cooler; and a first oil passage or conduit extending from the oil pump to a second oil passage or conduit that extends to the oil cooler, the first oil passage or conduit also extending to a third oil passage or conduit that extends to the lubricating passages or conduits, the first oil passage or conduit extending from the oil pump, the second oil passage or conduit, and the third oil passage or conduit, not including control valves to control a flow of oil to the lubricating passages and the electric machine, wherein the oil cooler and the lubricating passages or conduits of the gearbox are configured such that oil flow is passively directed through one or both of the oil cooler and the lubricating passages or conduits based on a first flow resistance of the oil cooler, a second flow resistance of the lubricating passages or conduits, and oil viscosity.

2. The system of claim 1, the fourth oil passage or conduit not extending to the lubricating passages or conduits, wherein the fourth oil passage or conduit extends between the oil cooler and the electric machine without any connecting or intervening passages or components, and a fifth oil passage or conduit extending from the electric machine to the oil sump.

3. The system of claim 1, wherein oil flow through the oil cooler is substantially prevented when oil temperature is below a threshold temperature due to a combination of oil viscosity of the oil and the first flow resistance of the oil cooler.

4. The system of claim 2, further comprising a sixth oil passage or conduit extending from the lubricating passages to the oil sump.

5. The system of claim 1, wherein, when the temperature of the oil is above the threshold, the oil flows through the second and third passages or conduits.

6. The system of claim 1, wherein the oil pump is one of mechanically driven and electrically driven.

7. The system of claim 6, further comprising a controller including executable instructions stored in non-transitory memory that cause the controller to activate the oil pump.

8. The system of claim 7, further comprising additional instructions that cause the controller to adjust a speed of the oil pump in response to an oil temperature.

9. A method for an electric powertrain, comprising:

pumping oil from a sump through a passage or conduit that extends from an oil pump to a second passage or conduit and a third passage or conduit, the second passage or conduit extending to an oil cooler, the third passage or conduit extending to lubrication circuits of a gearbox, the gearbox mechanically coupled to an electric machine, and an absence of control valves positioned along the passage or conduit, the second passage or conduit, and the third passage or conduit, wherein direction of oil flow is controlled by a combination of oil viscosity due to oil temperature and a resistance to oil flow of the oil cooler.

10. The method of claim 9, further comprising returning oil from the gearbox to the sump.

11. The method of claim 10, further comprising flowing oil from the oil cooler to the electric machine.

12. The method of claim 9, wherein oil flows through both the oil cooler and the lubrication circuits when oil temperature is above a threshold temperature, and wherein oil flow through the oil cooler is substantially prevented when oil temperature is below the threshold temperature.

13. The method of claim 2, further comprising returning oil from the electric machine to the sump.

14. The method of claim 9, further comprising activating the oil pump via a controller.

15. The method of claim 14, further comprising adjusting a speed of the oil pump via the controller in response to oil temperature and electric machine temperature.

16. A system, comprising:

an electric machine;

a gearbox mechanically coupled to the electric machine and wheels of a vehicle, the gearbox including lubricating passages or conduits;

an oil sump configured to receive returned oil from the electric machine and the gearbox;

an oil pump configured to draw oil from the oil sump;

an oil cooler;

an oil passage or conduit extending from the oil pump to a second oil passage or conduit that extends to the oil cooler, the oil passage or conduit also extending to a third oil passage or conduit that extends to the lubricating passages or conduits, the oil passage or conduit extending from the oil pump, the second oil passage or conduit, and the third oil passage or conduit, not including control valves to control a flow of oil to the lubricating passages and the electric machine;

a first oil circuit including the oil cooler and the electric machine; and a second oil circuit including the lubricating passages, wherein flow of oil through the first oil circuit is substantially prevented when oil temperature is below the threshold temperature due to a combination of a flow resistance of the first oil circuit relative to the second circuit and a viscosity of the oil when below the threshold temperature.

17. The system of claim 16, wherein oil flows through both the first oil circuit and the second oil circuit when oil temperature is above the threshold.

18. The system of claim 17, wherein the oil pump is mechanically driven.

19. The system of claim 17, wherein the oil pump is electrically driven.

20. The system of claim 16, further comprising a controller, the controller including executable instructions stored in non-transitory memory that cause the controller to adjust a speed of the oil pump in response to an oil temperature and an electric machine temperature.

* * * * *